Sept. 23, 1969     P. COHEN ET AL     3,468,764

METHOD AND APPARATUS FOR MEASURING THE CONCENTRATION OF BORON

Filed Jan. 28, 1966

WITNESSES
Theodore F. Wrobel
Lee P. Johns

INVENTORS
Paul Cohen
and Wilson D. Fletcher
BY
Frederick Shapoe
ATTORNEY

United States Patent Office 3,468,764
Patented Sept. 23, 1969

3,468,764
METHOD AND APPARATUS FOR MEASURING THE CONCENTRATION OF BORON
Paul Cohen and Wilson D. Fletcher, Pittsburgh, Pa., assignors to Westinghouse Electric Corporation, Pittsburgh, Pa., a corporation of Pennsylvania
Filed Jan. 28, 1966, Ser. No. 523,680
Int. Cl. B01k 3/00
U.S. Cl. 204—1                             8 Claims

ABSTRACT OF THE DISCLOSURE

An analyzer for determining the boron concentration in an aqueous solution of boron-containing material. The analyzer has means for adding a polyhydroxyl compound to increase the electrical conductivity of the solution and means for controlling the solution temperature cell means for continuously measuring electrical conductivity of the solution and for comparing the conductivity of the solution with that of an established standard.

---

This invention relates to a method and apparatus for continuously analyzing an aqueous moderator or coolant solutions of a nuclear reactor. More particularly, it pertains to a system based upon electrical conductivity for automatically analyzing the boric acid content of such solutions.

Boric acid is often added to a water moderator of nuclear power plants to control the nuclear reactivity. Inasmuch as the reactivity varies from time to time there is a need for frequent and rapid boron analysis so that an appropriate boron concentration may be maintained.

In the past analyses usually have been performed by plant personnel and are based upon manual titrimetric or colorimetric methods. Such methods however have not been suitable because of time delays of the order of at least 15 to 20 minutes. Presently available commercial analyzers are generally unsuitable either because of their insensitivity to small changes in boron concentration, or to excessive delays inherent in their mode of operation. Moreover, commercial boron analyzers of the automatic type have been very expensive and require excessive attendance and maintenance. Thus, there has been a need for accurate and fast automatic methods for analyzing the boric acid content of a water moderator.

It has been found that a reliable automatic boron analysis may be provided which is simple, relatively low in cost of manufacture, rapid, and sensitive to small changes in boron concentration. The analysis is based upon the increase in solution electrical conductivity which occurs when a polyhydroxyl compound is added to a solution containing boric acid or a borate salt.

Accordingly, it is an object of the present invention to provide a boron concentration analyzer and method for automatically measuring the boron concentration in the water moderator or coolant of a nuclear reactor.

It is another object of this invention to provide a boron analyzer and method for rapidly measuring small changes in boron concentration which is directly proportional to the electrical conductivity thereof.

Finally, it is an object of this invention to provide a boron analyzer and method that accomplishes the foregoing objects and desiderata in a simple and effective manner.

These and other objects and advantages of the present invention will become more apparent when considered in view of the following detailed description and drawings, in which.

Briefly, the device of this invention includes a liquid circulating system through which a boron solution to be tested is continuously passed. The system includes means for adding a polyhydroxyl compound such as mannitol to the solution, means for controlling the temperature of the solution, cell means for continuously measuring the electrical conductivity of the circulating solution, means for comparing the conductivity of the solution with that of an established standard, and means for continuously recording the difference of solution conductivities between the solution and the standard.

Moreover, this invention provides a method for continuously measuring the concentration of boron in an aqueous solution including the steps of continuously extracting a test sample solution from a reservoir of boron aqueous solution, adding a polyhydroxyl compound to the sample solution, passing an electrical current through the sample solution, measuring and comparing the electrical resistance of the sample solution with that of a standard aqueous boron solution, and continuously recording the resistance difference.

Figure 1:
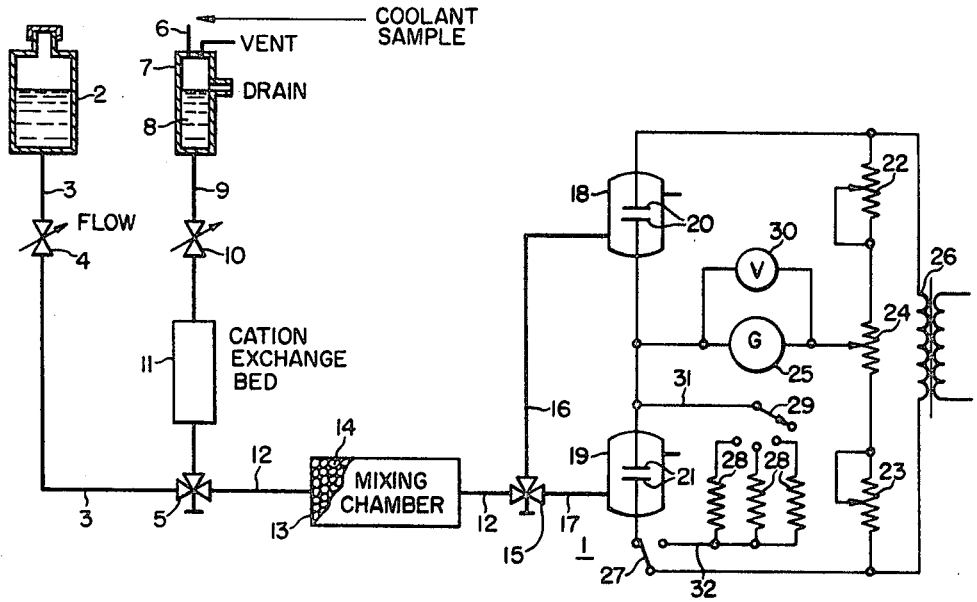
FIGURE 1 is a diagrammatic view of the device of the present invention.

The device of the present invention is generally indicated at 1 in FIG. 1. It includes a container 2 of standard boric acid solution which is connected by a conduit 3 having flow control valve means 4 therein to a selector valve 5. A conduit 6 leading from a supply or reservoir of aqueous moderator or coolant for a nuclear reactor (not shown) extends to a receptacle 7 where a test sample 8 of solution is maintained. A conduit 9, having a flow control valve 10 therein, extends through a cation exchange bed 11 and thence to the selector valve 5. After a sample solution 8 passes through the conductivity cell it flows directly to waste.

From the valve 5 a conduit 12 leads to a mixing chamber 13 for the addition of a polyhydroxyl compound such as a polyhydroxy hydrocarbon alcohol, $$C_nH_{(2n+2-x)}(OH)_x$$

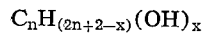

for example, glycerol [$C_3H_5(OH)_3$], ethylene glycol, or mannitol [$C_6H_8(OH)_6$], which is soluble in water. Where mannitol is used, it is provided as spheres 14 within the chamber 13. The conduit 12 then leads to a selector valve 15.

A pair of conduits 16 and 17 lead from the selector valve 15 to conductance cells 18 and 19, respectively. The cell 18 includes a pair of electrodes 20. Likewise, the cell 19 includes a pair of electrodes 21. As shown in FIG. 1 the electrodes 20 and 21 are part of the impedances of a Wheatstone bridge which includes temperature and cell constant compensating resistors 22 and 23, a balancing resistor 24, a galvanometer 25, and a source 26 of electric current such as a constant voltage transformer adapted for 12 volts and 60 cycle current.

In addition the Wheatstone bridge circuit is adapted to circumvent the electrodes 21 of the cell 19, by providing a switch 27 and a number of range resistors 28 of varying size which are connectable with a switch 29 by which the cell 19 may be shunted out.

Recording means 30 are provided for visual observation of the differences in the resistances between the electrodes 20 and 21, or the resistances 28. The recording means 30 may be a millivolt meter recorder adapted for continuous chart recording such as provided by the Minneapolis Honeywell Company. The several parts of the Wheatstone bridge including the members 20 to 30 are interconnected by wires in a conventional manner.

Figure 2:
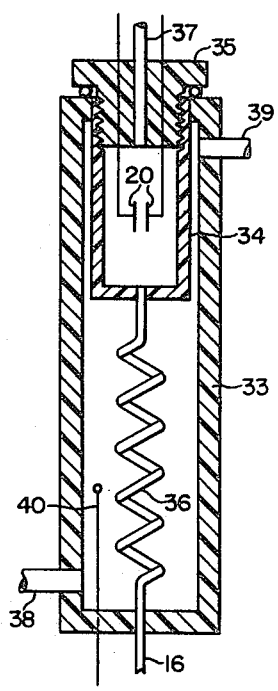
FIG. 2 is a vertical sectional view of a controlled temperature conductance cell for analyzing boron concentrations.

Inasmuch as the depiction of the cells 18 and 19 is merely exemplary in FIG. 1, a specific embodiment of a cell is shown in FIG. 2 wherein the cell includes an outer tubular or cylindrical housing 33, an inner cylindrical shell 34 and a closure cap 35. The outer housing 33 and the inner shell 34 are preferably composed of a plastic material such as polymethylmethacrylate. A coiled tube 36 extends from the lower end of the housing 33 to the lower end of the shell 34. The tube 36 conducts the solution into the cell 34 and into contact with the electrodes 20 from where it flows through an exit conduit 37. The tube 36 serves as a heat exchanger for bringing the sample temperature to that required for making the measurements.

For that purpose the housing 33 acts as a heat exchanger shell through which a constant temperature fluid is circulated by introducing the fluid through an inlet 38 and passing it out through a fluid outlet 39. A temperature indicating means 40 is provided within the housing 33. Accordingly, the specific embodiment of the cell shown in FIG. 2 provides for control of the temperature of the solution entering the inner shell 34 where the solution surrounds and closes the circuit between the electrodes 20. Although the foregoing description of the cell of FIG. 2 has included reference to electrodes 20 of the cell 18 of FIG. 1 it is understood that the cell 19 having electrodes 21 may be of similar construction.

Figure 3:
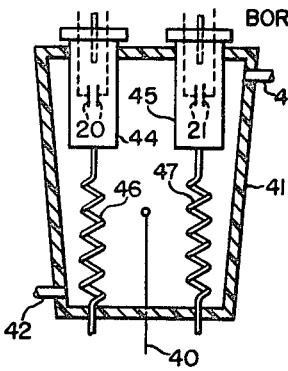
FIG. 3 is a vertical sectional view of a temperature conductance cell for analyzing boron concentrations of unknown and standard concentrations.

Another embodiment of the cell construction is shown in FIG. 3 in which two cells are combined in one housing 41 having coolant fluid inlet 42 and outlet 43 and having a pair of inner shells 44 and 45. One shell 44 may be used for testing the conductance of the sample coolant and is provided with the electrodes 20. The other shell 45 may be used for holding the standard boric acid solution and may be provided with electrodes 21. Both shells 44 and 45 are similar in construction to the shell 34 of FIG. 2 and each shell is provided with a solution inlet, such as the coiled tubes 46 and 47 extending from the lower wall of the housing 41 to the inner shells 44 and 45 respectively. Thus a sample solution entering the shell 44 is cooled by the same constant temperature fluid circulating through the housing 41 as is the standard boric acid solution entering the shell 45 through the coiled tube 47.

In operation the device of FIG. 1 is used primarily to measure the electrical conductance of an aqueous solution of moderator containing boric acid in comparison with the electrical conductance of a known standard boric acid solution. For that purpose a standard boric acid solution is conducted through the conduits 3 and 12 and the valves 5 and 15 into the cell 19.

After the standard boric acid solution is in the cell 19 so that the electrodes 21 are completely immersed the valves 5 and 15 are turned so that a sample of the coolant 8 is transmitted through the conduits 9, 12, and 16 to the cell 18. During testing the sample 8 flows continuously through the cell so that a record of the conductance is obtained over a period of time.

As the sample 8 flows through the conduit 9 it passes through the cation exchange bed 11 where impurities are removed. As the sample flows through the mixing chamber the polyhydroxyl compound, such as mannitol, is added to the solution by dissolving of the mannitol spheres 14. Similar dissolving occurs when the boric acid standard solution passes through the mixing chamber 13.

Since pure boric acid solutions are weakly conductive, a direct measure of solution conductance cannot be obtained to determine the boron concentration. A polyhydroxyl compound such as mannitol is added to increase the conductivity of boric acid solution. Thereafter any slight changes in the concentration of boric acid in the aqueous solution are detected by proportional increases or decreases in the solution conductance. Obviously any other water soluble compound which will increase the conductivity of boric acid solutions may be employed.

Figure 4:
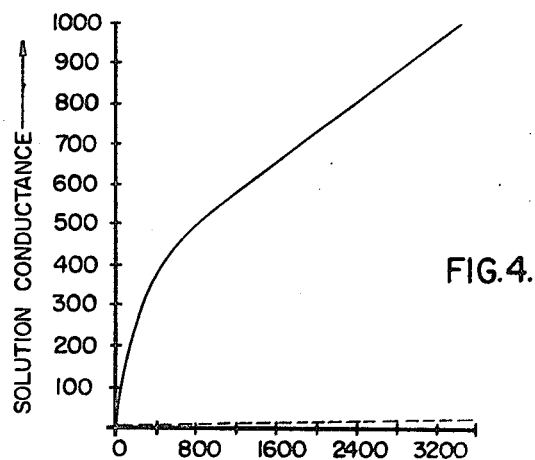
FIG. 4 is a graph showing the solution conductance of boric acid solutions with and without mannitol.

In FIG. 4 the chart shows the difference between solution conductance with increasing parts per million of boron in the solution where no mannitol is added and where mannitol is added. From the chart it is evident that the addition of mannitol readily increases the electrical conductivity of boron as a boric acid in an aqueous solution. However, excessive amounts of mannitol are not significant because mannitol per se is not a conductor.

As shown in FIG. 4 tests have indicated that in the range of from 0 to 800 parts per million boron, the conductance change is about 0.75 ($\mu$mho/cm.)/p.p.m. B, while in the range of 800 to 3600 p.p.m. boron, the conductance change is about 0.2 ($\mu$mho/cm.)/p.p.m. B. Accordingly, the slope of the solution conductance with mannitol added changes above the concentration of about 800 parts per million boron. The mannitol-conductance method is specific for boron because only boron as boric acid and borate salts form the mannitol complex. Moreover, although boric acid is a poor conductor and mannitol is not a conductor the addition of mannitol results in greater sensitivity of weakly conductive solutions of boric acid.

More important to the establishment of consistent results is the use of a constant temperature by flowing the solution being tested through a water-jacketed cooler such as the housings 33 and 41 of FIGS. 2 and 3. A constant temperature between the sample and the standard solutions must be maintained in order to avoid the introduction of an uncompensatable error.

In view of the conductance change differential between the lower range of 0 to about 800 parts per million boron and the upper range of 800 to 3600 parts per million boron different standard boric acid solutions may be used in conjunction with the balancing resistor 24. Moreover, the reactivity of a nuclear reactor varies during the life thereof. For that reason, the amount of boron in solution is very large at the beginning of the life of the reactor and is gradually diminished until the later stages when very little if any boron is retained in solution in the water moderator. For example, in the early stages of the life of a reactor there may be 3600 parts per million boron as boric acid in the water moderator solution, then as the fuel is consumed, the boron content may be reduced in increments of about 200 parts per million. The device and method of the present invention may be used in part to determine the various periods at which boron is eliminated from the moderator in order to extend the life of the fuel.

In addition to the foregoing it may be expedient to eliminate the use of a standard boric acid solution by providing a plurality of range resistors 28 of varying size and connected in parallel. Although three resistors 28 are shown in FIG. 1, it is understood that any greater or smaller number may be used. Thus, one resistor 28 may be selected to use in comparison with the electrical conductance of a boric acid solution passing through the cell 18 during the earlier stages of operation of a reactor. Thereafter another resistor 28 of different size may be used. When the resistors 28 are used, the switches 27 and 29 are used to close a circuit through the wires 31 and 32. Here again as the electrical conductance of the sample solution 8 passing through the cell 18 is changed for a given resistor 28, the balancing resistor 24 may be adjusted to compensate for any change in conductance until another resistor 28 of a different range is deemed useful.

The solution conductivity of the sample solution 8 is measured with the recording means 30 which may be either a meter indicator or a continuous strip chart recorder. It is also desirable to provide a solution temperature recording instrument such as a thermometer 40 (FIG. 2) to obtain corrections of solution conductance for any possible temperature changes.

The device 1 may be standardized periodically by flowing a known boric acid solution through the cell 18 instead of the sample solution 8.

Various modifications may be made within the spirit of the invention.

What is claimed is:

1. An analyzer for determining the boron concentration of an aqueous solution thereof comprising means for circulating an aqueous solution of boron-containing material, means connected thereto for adding a compound to the solution for increasing the electrical conductivity of the boron material, means for maintaining a predetermined temperature of the solution, cell means through which the solution passes for measuring the electrical conductivity of the circulating solution, means for comparing the conductivity of the solution with that of a standard, and means for indicating the difference in conductivity between the solution and the standard.

2. The device of claim 1 in which the cell means includes walls forming a solution-containing chamber having inlet and outlet conduits and having a pair of spaced electrodes in the chamber.

3. The device of claim 2 in which a resistance established in a solution being tested between the electrodes constitutes a portion of a Wheatstone bridge circuit.

4. The device of claim 1 in which the conductivity comparing means includes a Wheatstone bridge circuit.

5. The device of claim 1 in which the cell means includes walls forming a chamber having inlet and outlet conduits and having a pair of spaced electrodes, in which the means for comparing the conductivity of the solution includes walls forming a chamber having inlet and outlet conduits and having another pair of electrodes, and in which both of said means are parts of a Wheatstone bridge circuit.

6. A method for measuring the concentration of boron in an aqueous solution including the steps of extracting a sample solution from a reservoir of boron aqueous solution, adding a polyhydroxyl compound to the sample solution, passing an electrical current through the sample solution, measuring and comparing the electrical impedance of the sample solution with that of a standard resistance, and recording the resistance difference.

7. The method of claim 6 in which the step of measuring and comparing the electrical impedance includes the balancing of the impedance of the sample solution with the impedance in another leg of a Wheatstone bridge circuit.

8. The method of claim 6 in which the polyhydroxyl compound added to the sample solution is mannitol for increasing the electrical conductivity of the sample solution.

References Cited
UNITED STATES PATENTS 3,234,562  2/1966  Bell et al. _____ 204—1
3,271,111  9/1966  Boyd et al. _____ 23—230

RUDOLPH V. ROLINEC, Primary Examiner

C. F. ROBERTS, Assistant Examiner

U.S. Cl. X.R.

23—230, 253; 204—195; 324—30